(12) United States Patent
Lepp et al.

(10) Patent No.: US 12,477,309 B2
(45) Date of Patent: *Nov. 18, 2025

(54) CONTROLLING TRANSMISSION OF GROUP-ADDRESSED DATA

(71) Applicant: Malikie Innovations Limited, Dublin (IE)

(72) Inventors: James Randolph Winter Lepp, Ottawa (CA); Stephen McCann, Southampton (GB); Michael Peter Montemurro, Mississauga (CA)

(73) Assignee: Malikie Innovations Limited (IE)

( * ) Notice: Subject to any disclaimer, the term of this patent is extended or adjusted under 35 U.S.C. 154(b) by 0 days.

This patent is subject to a terminal disclaimer.

(21) Appl. No.: 18/417,062

(22) Filed: Jan. 19, 2024

(65) Prior Publication Data

US 2024/0214777 A1    Jun. 27, 2024

Related U.S. Application Data

(63) Continuation of application No. 16/242,798, filed on Jan. 8, 2019, now Pat. No. 12,082,076.

(51) Int. Cl.
H04W 4/06     (2009.01)
H04L 12/18    (2006.01)
H04W 72/30    (2023.01)
H04W 84/12    (2009.01)

(52) U.S. Cl.
CPC ............ *H04W 4/06* (2013.01); *H04L 12/189* (2013.01); *H04W 72/30* (2023.01); *H04W 84/12* (2013.01)

(58) Field of Classification Search
CPC ....... H04W 4/06; H04W 72/30; H04W 84/12; H04W 76/40; H04L 12/189

USPC ......................................................... 370/312
See application file for complete search history.

(56) References Cited

U.S. PATENT DOCUMENTS

| | | |
|---|---|---|
| 8,094,602 B2 | 1/2012 | Gutierrez |
| 8,929,328 B2 | 1/2015 | Wu et al. |
| 9,814,085 B2 | 11/2017 | Cherian et al. |
| 11,039,374 B2 | 6/2021 | Mccann et al. |
| 2006/0009247 A1 | 1/2006 | Kelley et al. |
| 2006/0229072 A1 | 10/2006 | Grilli et al. |

(Continued)

FOREIGN PATENT DOCUMENTS

| | | |
|---|---|---|
| CN | 101232391 A | 7/2008 |
| CN | 101331439 A | 12/2008 |

(Continued)

OTHER PUBLICATIONS

IEEE Standard for Information technology—Telecommunications and information exchange between systems Local and metropolitan area networks—Part 11: Wireless LAN Medium Access Control (MAC) and Physical Layer (PHY) Specifications, IEEE Computer Society Sponsored by the LAN/MAN Stand (Year: 2012).*

(Continued)

*Primary Examiner* — Nizam U Ahmed
(74) *Attorney, Agent, or Firm* — Botos Churchill IP Law LLP

(57) ABSTRACT

In some examples, a first wireless device sends, to a second wireless device, a control indication that controls transmission of group-addressed data between the first wireless device and the second wireless device over a wireless local area network (WLAN).

19 Claims, 5 Drawing Sheets

(56) References Cited

U.S. PATENT DOCUMENTS

| | | | |
|---|---|---|---|
| 2007/0242695 | A1 | 10/2007 | Xu |
| 2008/0049703 | A1 | 2/2008 | Kneckt et al. |
| 2008/0181161 | A1 | 7/2008 | Gi et al. |
| 2009/0052362 | A1 | 2/2009 | Meier et al. |
| 2009/0097428 | A1 | 4/2009 | Kneckt et al. |
| 2014/0010222 | A1 | 1/2014 | Chen et al. |
| 2015/0112767 | A1 | 4/2015 | Shatzkamer et al. |
| 2015/0381676 | A1 | 12/2015 | Seok |
| 2016/0127221 | A1 | 5/2016 | Theogaraj et al. |
| 2016/0219510 | A1 | 7/2016 | Asterjadhi et al. |
| 2016/0316472 | A1 | 10/2016 | Kwon |
| 2017/0070418 | A1 | 3/2017 | Li et al. |
| 2017/0164372 | A1 | 6/2017 | Gupta et al. |
| 2018/0027485 | A1 | 1/2018 | Kneckt et al. |
| 2018/0115938 | A1 | 4/2018 | Mccann et al. |
| 2019/0124638 | A1 | 4/2019 | Lim et al. |
| 2019/0200295 | A1 | 6/2019 | Hartman et al. |
| 2019/0239032 | A1* | 8/2019 | Balasubramanian .................... H04L 65/611 |
| 2020/0344576 | A1* | 10/2020 | Li .......................... H04W 4/06 |
| 2020/0344695 | A1* | 10/2020 | Wang ................ H04W 52/0274 |
| 2021/0289424 | A1 | 9/2021 | Mccann et al. |

FOREIGN PATENT DOCUMENTS

| | | |
|---|---|---|
| CN | 103891357 A | 6/2014 |
| CN | 104396210 A | 3/2015 |
| CN | 104468139 A | 3/2015 |
| GB | 2561615 A | 10/2018 |

OTHER PUBLICATIONS

3GPP TS 23.246 V15.0.0, 3rd Generation Partnership Project; Technical Specification Group Services and System Aspects; Multimedia Broadcast/Multicast Service (MBMS); Architecture and functional description, Dec. 2017 (Release 15) (77 pages).

3GPP TS 36.300 V15.3.0, 3rd Generation Partnership Project; Technical Specification Group Radio Access Network; Evolved Universal Terrestrial Radio Access (E-UTRA) and Evolved Universal Terrestrial Radio Access Network (EUTRAN).

3GPP TSG-CT WG1 Meeting #84bis, Porto (Portugal), Change Request, VODAFONE: Tunnelling over restrictive access networks IMS case, Oct. 7-11, 2013 (6 pages).

Canadian Intellectual Property Office, International Search Report for PCT/CA2019/051831 dated Mar. 4, 2020 (3 pages).

Canadian Intellectual Property Office, Notification of Transmittal of the International Search Report and The Written Opinion of the International Searching Authority, or the Declaration for PCT/CA2019/051831 dated Mar. 4, 2020 (1 page).

Canadian Intellectual Property Office, Written Opinion for PCT/CA2019/051831 dated Mar. 4, 2020 (5 pages).

Cisco Public, Technical white paper, IEEE 802.11ax: The Sixth Generation of Wi-Fi, 2018 (15 pages).

Eee Standards Association, IEEE Standard for Information Technology—Telecommunications and Information Exchange Between Systems Local and Metropolitan Area Networks—Specific Requirements Part 11.

European Patent Office. Supplementary European Search Report for Appl. No. 19908765.1 dated Aug. 23, 2022 (10 pages).

Inoue, Yasuhiko, NTT, Submission—IEEE 802.11-17/0561r0, Some Use Cases for Broadcast Services over WLAN, Mar. 2018 (9 pages).

Lisovy, LWN.net, 802.11p OCB mode, Sep. 11, 2014 (3 pages).

McCann, Stephen et al., U.S. Appl. No. 16/124,847 entitled Indicating Support for a Broadcast Service filed Sep. 7, 2018 (31 pages).

McCann, Stephen, BCS Problem Statement, IEEE 802.11-18/0972r0, May 2018 (13 pages).

McCann, Stephen, Submission—IEEE 802.11-18/1091r0, P802.11aq Broadcast Features, Jun. 2018 (6 pages).

Morioka, Hitoshi, Broadcast Service on WLAN, IEEE 802.11-17/1736r4, Jan. 2018 (22 pages).

Office Action for Canadian Patent Application No. 3,120,483, Oct. 4, 2023, 4 Pages.

The Patent Office of the People's Republic of China, Notification of Second Office Action for Appl. No. 2019800882864 dated Aug. 24, 2022 (7 pages).

Wikipedia, IGMP snooping last edited on Nov. 14, 2018 (3 pages).

"Telecommunications and information exchange between systems Local and metropolitan area networks—Part 11: Wireless LAN Medium Access Control (MAC) and Physical Layer (PHY) Specifications", IEEE Standard for Information technology—IEEE Computer Society Sponsored by the LAN/MAN Stand (Year: 2012).

"3GPP TSG-CT WG1 Meeting #84bis Porto (Portugal)", 3GPP TSG-CT WG1 Meeting #84bis Porto (Portugal) Change Request 24.229 CR 4712 rev 3 Current version: 12.2.0, Dec. 2, 2013, pp. 1-5.

"Extended European Search Report for European Patent Application No. 24215569.5", Feb. 17, 2025, pp. 1-6.

* cited by examiner

| Key ID | Tx | MGTK Key ID | ... | GTK or MGTK |
|---|---|---|---|---|
| Bits 0-1 (Both Set to 1 for MGTK) | Bit 2 | Bits 3-5 | | 6 Ocets |
| 402 | | 404 | | 406 |

FIG. 4

| Reserved | MGTK Key ID | Ext IV | Key ID |
|---|---|---|---|
| 502 | 504 | 506 | 508 |

CONTROLLING TRANSMISSION OF GROUP-ADDRESSED DATA

CROSS REFERENCE TO RELATED APPLICATIONS

This application is a continuation of U.S. patent application Ser. No. 16/242,798, filed Jan. 8, 2019, the disclosure of which is incorporated herein by reference.

BACKGROUND

Electronic devices can communicate over wired or wireless networks. Wireless networks can include a wireless local area network (WLAN), which includes one or more wireless access points (APs) to which devices are able to wirelessly connect.

In a wireless network, an AP can send a message targeted to multiple recipient wireless devices. This form of communication can include a broadcast of the message (which is targeted at all wireless devices within range of the AP or that satisfies some other condition) or a multicast of the message (which is targeted at wireless devices within a specified group regardless of whether they are in range of the AP). Broadcast and multicast transmissions can more generally be referred to as "group-addressed transmissions", where the "group" of wireless devices targeted can be all wireless devices within range of the transmitting device or that satisfies some other condition, or a group that is associated with a specified address (e.g., a multicast address). Controlling group-addressed transmissions in a WLAN can be associated with various challenges.

BRIEF DESCRIPTION OF THE DRAWINGS

Some implementations of the present disclosure are described with respect to the following figures.

FIGS. 4 and 5 are block diagrams of portions of messages to support Multicast Group Temporal Key (MGTK) according to further implementations of the present disclosure.

Figure 1:
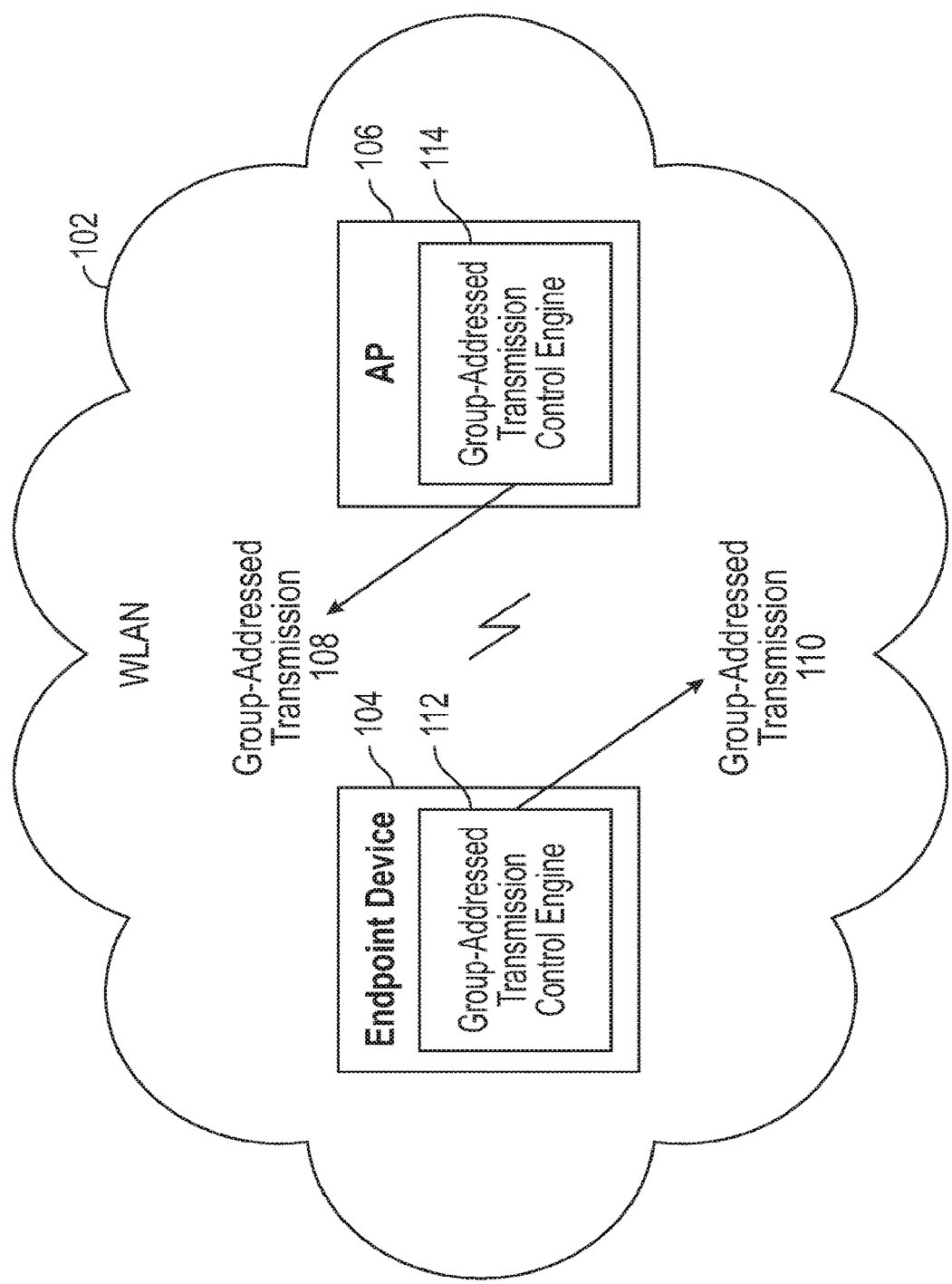
FIGS. 1, 1A and 1B are block diagrams of example arrangements each including wireless devices that are able to communicate group-addressed data according to some implementations of the present disclosure.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In a wireless local area network (WLAN), wireless devices may communicate with one another. A wireless device can include an endpoint device or a wireless access point (AP). A wireless AP (or more simply, an AP) can refer to a communication device to which a wireless device can establish a wireless connection to communicate with other endpoint devices. WLANs can include wireless networks that operate according to the Institute of Electrical and Electronic Engineers (IEEE) 802.11 or Wi-Fi Alliance Specifications.

Examples of endpoint devices include stations (STAs), access points (APs), computers (e.g., tablet computers, notebook computers, desktop computers, server computers, etc.), handheld devices (e.g. smart phones, personal digital assistants, etc.), wearable devices (smart watches, electronic eyeglasses, head-mounted devices, etc.), game appliances, health monitors, vehicles (or equipment in vehicles), cargo transportation units (e.g., trailers, containers, etc.), Internet of Things (IOT) devices, roadside units (RSUs) (such as devices in traffic lights, traffic signs, etc., that are able to transmit information to vehicles or other devices), storage devices, communication nodes, or other types of endpoint or user devices that are able to communicate wirelessly. Endpoint devices can include mobile devices and/or fixed position devices. More generally, an endpoint device can refer to an electronic device that is able to communicate wirelessly.

An IEEE 802.11 Broadcast Services (BCS) task group (IEEE 802.11bc) is working to improve the efficiency and applicability of broadcast services. The broadcasting or multicasting of information according to "broadcast services" refers to broadcasting or multicasting information that may be different from control information used for associating a device with a network or establishing a connection with a network. For example, broadcasting or multicasting of information according to "broadcast services" can refer to broadcasting or multicasting data, such as user data, application program data, vehicle-related data (e.g., data relating to vehicles, vehicular traffic, road conditions, etc.), and/or other types of data.

The following are some examples of broadcast services.

A downstream broadcast service involves a source wireless device (e.g., an AP or another wireless device) broadcasting or multicasting information to any device capable of receiving the information. The information may be secured, so that only devices with an established security association to the source wireless device can correctly decode the information. Security association is established when a device has successfully authenticated and has been authorized to communicate. Example use cases of downstream broadcast services include any or some combination of the following: live streaming of data, advertisements (such as of services or products or other information), billboards, emergency information, and so forth.

A vehicular broadcast service involves a source wireless device (e.g., a roadside unit or RSU, a vehicle, or other wireless device) broadcasting or multicasting information to any device capable of receiving the information. The vehicular broadcast service differs from the downstream broadcast service in that either the source or receiving wireless device may be moving at high speed relative to each other. Example use cases include any or some combination of advanced railroad grade crossing, broadcast of traveler information, and so forth.

An uplink broadcast service involves a source wireless device (e.g., a sensor or other wireless device) broadcasting or multicasting information (in an uplink) to any device capable of receiving the information. The uplink broadcast service differs from the downstream broadcast service or the vehicular broadcast service as the source wireless device may be a transmit-only device and have restricted capabilities (e.g., the source wireless device can include an IoT device, etc.). Example use cases include transmission of sensor data and so forth.

In a WLAN according to IEEE 802.11, association between a wireless device and the WLAN refers to the establishment of a connection between the wireless device and another wireless device (e.g., an AP) that already has a connection to the WLAN. A "pre-associated state" of a wireless device refers to a state of the wireless device before the wireless device has established a connection with a WLAN. This state is also referred to as the unauthenticated, unassociated state or State 1.

Other states defined by IEEE 802.11 include an authenticated, unassociated state (State 2), an authenticated, associated state, but pending Robust Security Network (RSN) authentication (State 3), and an authenticated, associated with RSN association established state (State 4).

As used here, the broadcasting or multicasting of data can normally be referred to as group-addressed communications of group-addressed data. A "group" of wireless devices targeted in group-addressed communications can be all wireless devices within range of the transmitting device or that satisfy some other condition, or a group that is associated with a specified address (e.g., a multicast address).

Group-addressed transmissions in a WLAN can be associated with various issues. For example, traditional techniques or systems cannot address how transmission of group-addressed data can be performed in relation to unassociated wireless devices. Having a wireless device perform association with a WLAN so that transmissions of group-addressed data can occur can be inefficient, since it can take a relatively long time to perform the association, and the association can involve an exchange of a number of messages between the wireless device and the WLAN, which can take up communication resources.

Another issue relates to sending group-addressed data to a wireless device that is in a power-save mode (also referred to as a "doze state" or a "sleep state"). In the power-save mode, various components of the wireless device are powered off to reduce power consumption at the wireless device as compared to when the components are powered on. In some cases, if no differentiation is made between broadcast data and multicast data, a wireless device that is operating in a power-save mode may be signaled to wake up to receive multicast data that is not targeted to the wireless device. This results in wasted power consumption of the wireless device in waking up from the power-save mode to receive multicast data that the wireless device then determines is not targeted to the wireless device.

In some cases, when there are wireless devices in a power-save mode belonging to a Basic Service Set (BSS) of an AP, the AP may cache (or store) group-addressed data that are targeted to the wireless devices in the power-save mode, and can later deliver the data in a unicast transmission to each of the wireless devices as the wireless device transition out of the power-save mode. A BSS typically refers to a group of wireless devices associated with one another, where one wireless device is an AP. If there are a large number of wireless devices, sending data in unicast transmissions can lead to replication of a large number of data frames to be transmitted in unicast transmissions to the corresponding wireless devices. Such unicast transmissions can be inefficient.

A further issue relates to security of group-addressed data. In some examples, security in a BSS provides an encryption key (or more simply, a "key") for encrypting a data frame, where the key is based on a pairwise association between a wireless device and another wireless device (e.g., an AP). A group key can also be defined for group-addressed data frames in the BSS, where the group key is shared among all wireless devices in the WLAN. However, defining a group key that is shared by all wireless devices in the WLAN does not provide flexibility in cases where multiple keys may have to be used for different streams of group-addressed data or different groups of wireless devices.

FIG. 1 is a block diagram of an example network arrangement that includes a WLAN 102. The WLAN 102 includes one or more APs 106 with which one or more endpoint devices 104 are able to wirelessly communicate. The WLAN 102 can include multiple APs, and there may be multiple endpoint devices to communicate with the one or more APs of the WLAN 102.

In some examples according to FIG. 1, the AP 106 can be a source wireless device that is able to broadcast or multicast information (in a group-addressed transmission 108) according to a broadcast service, and the endpoint device 104 can be a recipient wireless device to receive broadcast or multicast information according to the broadcast service. In other examples, the endpoint device 104 can be a source wireless device that can send broadcast or multicast information (in a group-addressed transmission 110) according to a broadcast service to one or more recipient wireless devices.

In further examples, another wireless device (not shown) can be coupled to the WLAN 102 that can act as a source wireless device or a recipient wireless device to communicate group-addressed data according to a broadcast service with either the endpoint device 104 or the AP 106.

More generally, a "wireless device" can refer to either an endpoint device or an AP. A wireless device can perform group-addressed transmission of group-addressed data to other wireless devices.

As shown in FIG. 1, the endpoint device 104 includes a group-addressed transmission control engine 112 that is able to control the communication of group-addressed data. Similarly, the AP 106 includes a group-addressed transmission control engine 114 that is able to control the transmission of group-addressed data.

As used here, an "engine" can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, an "engine" can refer to a combination of a hardware processing circuit and machine-readable instructions (software and/or firmware) executable on the hardware processing circuit.

Group-Addressed Transmission from a Wireless Device to Infrastructure

Figure 1A:
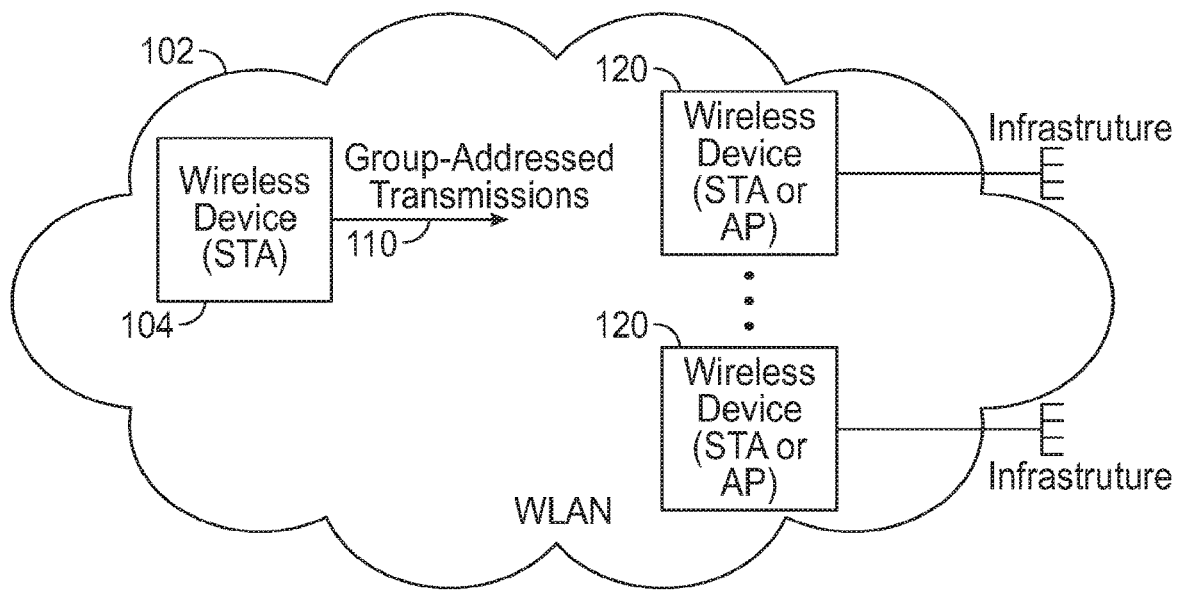

In some examples, as shown in FIG. 1A, a wireless endpoint device 104, such as a non-AP station (STA), can perform group-addressed transmissions 110 to one or more other wireless devices 120 that are part of a network infrastructure (e.g., the WLAN 102). The "network infrastructure" can include an AP or another wireless device that is part of a network. In some examples, the wireless device that performs group-addressed transmissions can include a sensor device, an RSU, a vehicle, or any other type of wireless device. In some cases, it is desired that the wireless device performs the group-addressed transmissions while the wireless device is in the unassociated state (State 1 of IEEE 802.11 as discussed above). Thus, a source wireless device can send a group-addressed transmission to one or more other recipient wireless devices that are within range of the source wireless device.

In examples where the endpoint device 104 includes sensor data to send, the sensor data can be encoded and transmitted to devices (e.g., monitoring devices) that subscribe to a stream of the sensor data. A "stream" refers to a flow of data that is separately identifiable. In some examples, the stream can be sent in an Outside the Context of a BSS (OCB) mode or an Independent BSS (IBSS) mode.

The OCB mode is defined by IEEE 802.11. The OCB can be used within 10 and 20 megahertz (MHz) wide channels in the 5.9 gigahertz (GHz) band for a vehicular environment. No authentication or association between the endpoint device 104 and an AP has to be performed for communications between the endpoint device 104 and the AP 106. In OCB operation the AP (106) is treated as a peer STA. A parameter to be configured is the channel (central frequency and bandwidth) to communicate on, which can be configured beforehand.

An enhanced OCB mode is also being defined by IEEE 802.11bd. This may allow operation of enhanced OCB devices outside of the 5.9 GHz band (e.g., in the rest of the 5 GHZ band) and also provide the ability to use other channel bandwidths, apart from 10 and 20 MHZ.

In other examples, the endpoint device 104 can be operated in an IBSS mode. An IBSS refers to an ad-hoc network that is without an AP. In IBSS mode, a source IBSS wireless device can perform a group-addressed transmission to one or more other IBSS wireless devices.

Group-Addressed Transmission Start Procedure

Figure 2:
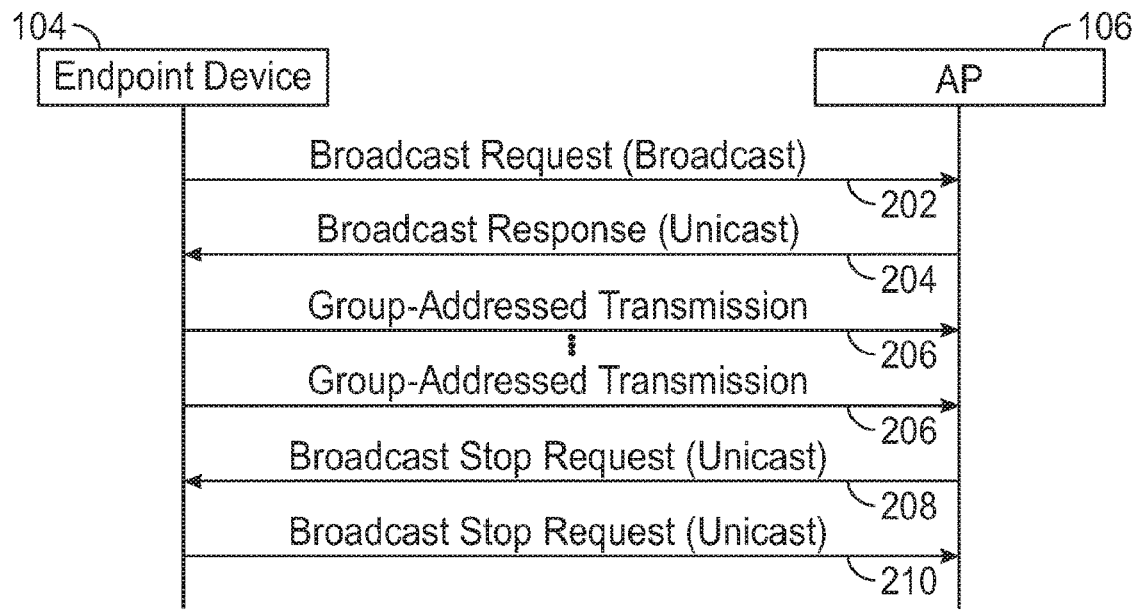
FIG. 2 is a message flow diagram of a process relating to a wireless device sending group-addressed data, in some implementations of the present disclosure.

FIG. 2 is a message flow diagram of an example process performed between the endpoint device 104 (that supports the signaling depicted in FIG. 2) and the AP 106 (to allow the endpoint device 104 to start a group-addressed transmission of data). Note that the AP 106 may already have been involved in receiving group-addressed transmissions from one or more other wireless devices, some of which may not support the signaling depicted in FIG. 2. Although FIG. 2 shows the AP 106 as being a recipient wireless device for the receipt of group-addressed data from the endpoint device 104, it is noted that in other examples, other wireless devices can receive the group-addressed data from the endpoint device 104. Such other wireless devices can receive the group-addressed data directly from the endpoint device 104, or the other wireless devices can receive the group-addressed data forwarded by the AP 106 after the AP 106 has received the group-addressed data from the endpoint device 104.

To start the group-addressed transmission, the endpoint device 104 sends (at 202) a Broadcast Request message. The Broadcast Request message is broadcast by the endpoint device 104 for receipt by any APs within the range of the endpoint device 104. The Broadcast Request message may be sent by the group-addressed transmission control engine 112 (FIG. 1), for example. In the OCB case, the Broadcast Request message can be sent to another endpoint device instead of an AP.

The Broadcast Request message is sent with a group-addressed destination address and a group-addressed BSS identity (BSSID), for indicating that a group-addressed transmission is requested by the endpoint device 104. The message contains information about the stream or streams the device is advertising to send in a group-addressed transmission. A "stream" refers to a flow of data that is separately identifiable. The sending of the Broadcast Request message is an example of how a wireless device can subscribe to one or more streams that are sent in group-addressed transmission(s).

Optionally the content/payload of the Broadcast Request message is secured (encrypted or signed) using keys set ahead of time. The signing and/or encrypting can be based on IEEE 1609.2 certificates, such as IEEE 1609.2 certificates. Examples of information in the Broadcast Request message can include metadata such as any or some combination of the following: a stream identifier (e.g., a name, identifier, or address to identify a stream), stream channel number (to identify a channel in which the stream is communicated), a stream camera angle (indicating an angle of a camera in examples where the endpoint device 104 is a camera), a video resolution and/or frame rate (in examples where the endpoint device 104 is a camera), an audio/video encoding bitrate in examples where the endpoint device 104 captures audio and/or video), a track number (to identify a track in examples where data is sent in multiple tracks), and so forth.

In response to the Broadcast Request message, the group-addressed transmission control engine 114 in the AP 106 sends (at 204) a Broadcast Response message. The Broadcast Response message is a unicast message sent by the AP 106 (or another wireless device) that received the Broadcast Request message from the endpoint device 104. The Broadcast Response message 204 is directed at the endpoint device 104.

The Broadcast Response message includes an accept or reject indication. In the case where the Broadcast Request message identified multiple streams of group-addressed data, the Broadcast Response message can contain one or more stream indications (e.g., information elements, etc.) to indicate which one or more of the streams the recipient wireless device (the AP 106 in the example of FIG. 2) has chosen to receive. The Broadcast Response message may contain a time limit indication (a time duration or end time) during which the recipient wireless device has chosen to receive the stream(s) of group-addressed data.

In response to receiving the Broadcast Response message, and assuming that the Broadcast Response message accepted the transmission of one or more streams of group-addressed data, the endpoint device 104 sends (at 206), in an uplink, one or more group-addressed transmissions of the stream(s) chosen by the AP 106 as indicated by the one or more stream indications in the Broadcast Response message.

In some examples, the group-addressed data is not acknowledged by the AP 106 (or other recipient wireless device). Note that the group-addressed transmissions (206) can be periodic transmissions (transmitted every regular time period) or intermittent transmissions (transmitted when triggered by an event, such as a temperature going outside a specified range, etc.).

Each group-addressed transmission (206) can include one or more group-addressed frames (e.g., a data frame and/or a management frame). In each data frame, a destination address is set to a multicast address or broadcast address.

For communication while the sender wireless device (e.g., 104) is in the unassociated state, the following three addresses in a header of a frame are set: a source address, which can be a source MAC address, of the sender wireless device; a destination address, which can be a group address (broadcast or multicast address representing a group-addressed stream); and a group-addressed BSSID set to a specified value, such as FF-FF-FF-FF-FE (or another address with an I/G bit set to G).

A recipient wireless device can choose to process a received frame as a broadcast or multicast stream based on all three of the addresses above, or just a subset.

As an example, the endpoint device 104 can include a temperature sensor, a pressure sensor, and a humidity sensor. Temperature data from the temperature sensor is to be sent in a temperature data stream, pressure data from the pressure sensor is to be sent in a pressure data stream, and humidity data from the humidity sensor is to be sent in a humidity data stream (three streams in this example). The Broadcast Request message includes information about the three streams. The Broadcast Response message indicates which of the three streams the AP 106 has chosen to receive.

The group-addressed transmission control engine 112 of the endpoint device 104 can consider the selection of which streams were selected by the AP 106 for receipt when the group-addressed transmission control engine 112 decides which streams to start sending. Note that there may be more than one recipient wireless device for the streams within the broadcast service area (BSA), such that the group-addressed transmission control engine 112 can take into account Broadcast Response messages from more than one recipient wireless device when deciding which streams to transmit. For example, recipient wireless device 1 may choose stream 1 but not streams 2 and 3, but recipient 2 may choose streams 1 and 2 but not stream 3. In such examples, the group-addressed transmission control engine 112 can decide to transmit streams 1 and 2, but not stream 3.

Note that the device (e.g., the AP 106 in FIG. 2) that receives the Broadcast Request message may not be the endpoint of a stream of data. The AP 106 may forward the stream of data to another entity in the network. The IEEE 802.11 three address format may include a destination address that exists elsewhere behind the AP 106 in the LAN/WLAN. In such examples, the AP 106 can rebroadcast or re-multicast the data frames of a stream on the entire LAN, or the AP 106 may unicast the data frames of the stream to Internet Group Management Protocol (IGMP)-snooped recipient(s) wireless devices.

Group-Addressed Transmission Stop Procedure

At some point, the AP 106 (the recipient wireless device) (or another wireless coupled to the AP 106) may decide that the AP 106 wishes to stop receiving group-addressed data. The AP 106 sends (at 208) a Broadcast Stop Request message to the endpoint device 104. The Broadcast Stop Request message can be a unicast message individually addressed to the endpoint device 104.

The Broadcast Stop Request message may indicate the specific one or more streams to cease transmitting. This may be identified by a stream identifier, such as a group-addressed MAC address, a group-addressed IP address, or another identity. The endpoint device 104 considers the information in the Broadcast Stop Request message when deciding whether or not to stop the group-addressed transmission of a given stream. If for example there are multiple recipient wireless devices of a stream, the group-addressed transmission control engine 112 of the endpoint device 104 may continue to transmit the stream even though one of the recipient wireless devices sent a Broadcast Stop Request message to stop the stream.

In response to the Broadcast Stop Request message, the group-addressed transmission control engine 112 of the endpoint device 104 sends (at 210) a Broadcast Stop Response message to acknowledge the receipt of the Broadcast Stop Request message. The Broadcast Stop Response message is unicast to the AP 106. In alternative implementations, the endpoint device 104 may send the Broadcast Stop Request message to the AP 106, requesting the AP 106 to stop the group-addressed transmission of a given stream. The AP 106 would then transmit a Broadcast Stop Response message to the endpoint device 104 to acknowledge the receipt of the Broadcast Stop Request message.

FIG. 2 shows an example where in-band control signaling (i.e., control signaling exchanged over a channel of the WLAN 102) is exchanged between the endpoint device 104 and the AP 106 (in the form of the messages 202, 204, 208, and 210) for controlling the group-addressed transmission of data. In other examples, the exchange of messages for controlling the group-addressed transmission of data can be negotiated out-of-band, i.e., over a communication link that is separate from the WLAN 102. The control messages that are exchanged can establish channel information, a data rate, and a scheduling of the group-addressed transmission of data. There can also be a subscription process where one or more recipient wireless devices, such as the AP 106, are configured with traffic characteristics and sensor information.

In some examples, security (privacy, trust, integrity) can be implemented by provisioning a security association. A mechanism can be provided for a recipient wireless device to subscribe to a sender wireless device to receive group-addressed transmissions. Alternatively, key distribution an encryption key for encrypting group-addressed data can be performed using an out-of-band mechanism (e.g., through a higher layer protocol). In this case, the higher layer protocol negotiates the key and once a key is agreed by the sender and recipient wireless devices, encryption at layer 2 (L2) can be used.

Group-Addressed Transmission in the Downlink from Infrastructure

Figure 1B:
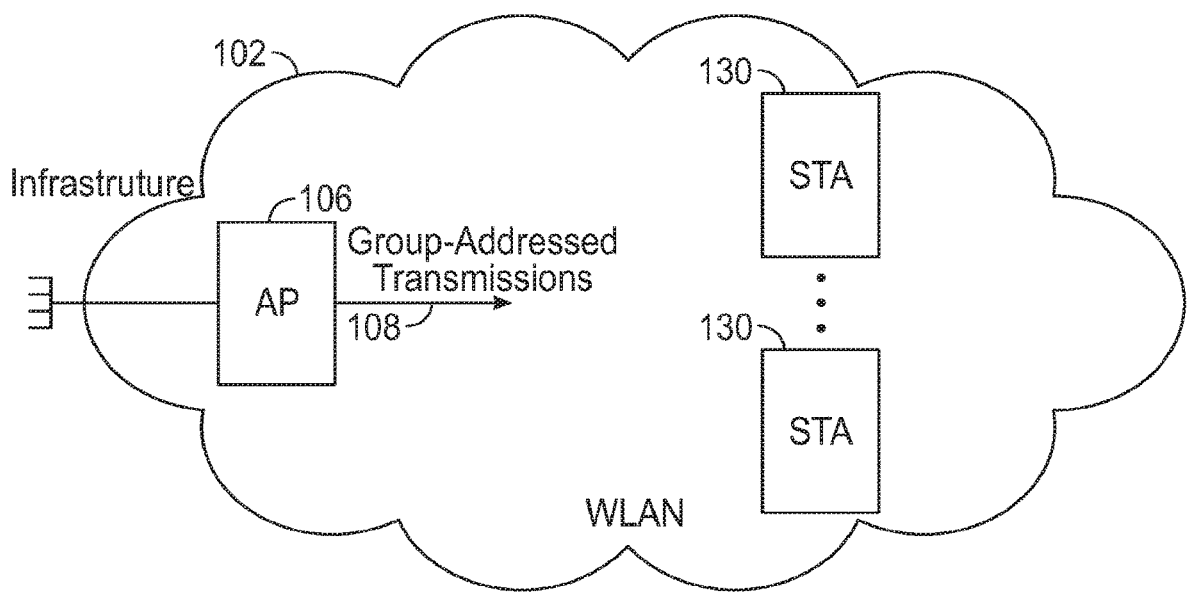

In further examples, as shown in FIG. 1B, network infrastructure equipment, such as the AP 106, can transmit group-addressed data (in 108) in a downlink to one or more recipient wireless devices (e.g., STAs 130, one of which can be the endpoint device 104), such as one or more associated wireless devices (e.g., wireless devices in State 4 as discussed above) or unassociated wireless devices (e.g., wireless devices in State 1 that is in the same BSA as the AP).

Figure 3:
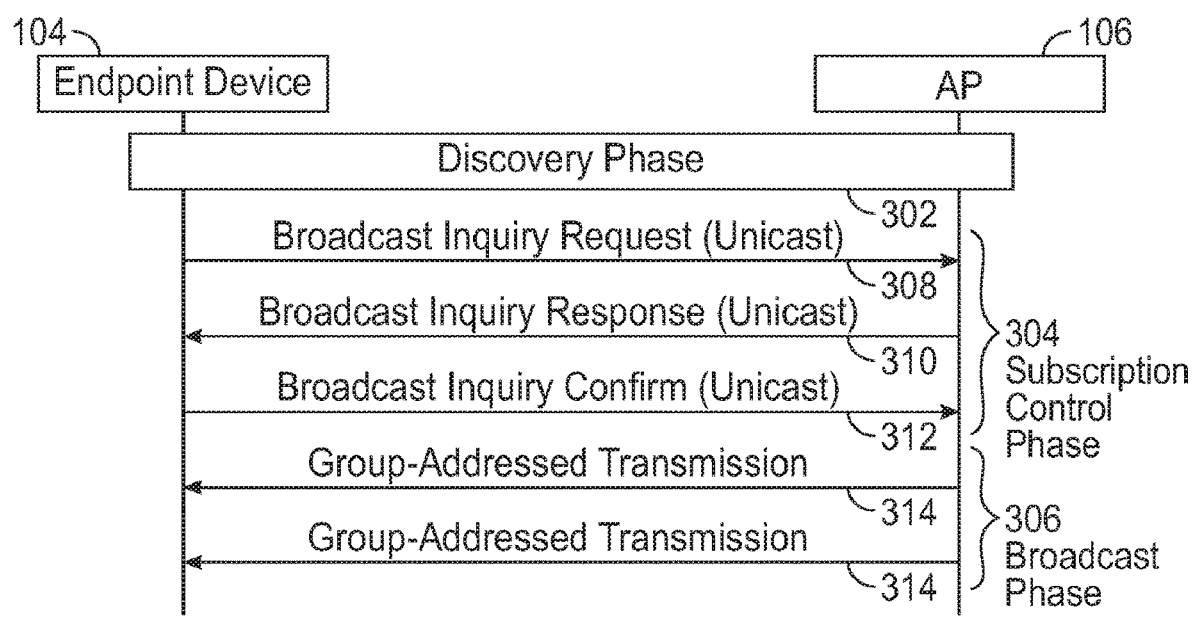
FIG. 3 is a message flow diagram of an access point (AP) sending group-addressed data to a wireless device, according to further implementations of the present disclosure.

FIG. 3 is a message flow diagram of a process between the endpoint device 104 and the AP 106. The message flow diagram of FIG. 3 includes a discovery phase 302, a subscription/control phase 304, and a broadcast phase 306. In the discovery phase 302, the AP 106 can advertise that the AP 106 has data to send in group-addressed transmission(s) according to broadcast services. The discovery phase 302 can use techniques as described in U.S. application Ser. No. 16/124,847, entitled "Indicating Support for a Broadcast Service," filed Sep. 7, 2018.

In some examples, in the discovery phase 302, the AP 106 that is provisioned with the ability to send group-addressed transmission(s) sends an indication of support for a broadcast service(s). The indication of support for broadcast service(s) (hereinafter "broadcast service indication") can be in the form of an information element (e.g., a multi-bit field or a single bit) advertising that the source wireless device (e.g., the endpoint device 104 or the AP 106) can provide a broadcast service (or multiple broadcast services).

The broadcast service indication can be included in any of various different messages. For example, the broadcast service indication can be included in a beacon that is transmitted by the AP 106 for receipt by multiple wireless devices within a wireless range of the AP. A beacon from an AP can include a Service Set Identifier (SSID) of the AP, to identify the WLAN 102. The beacon can also include other information, which according to some implementations of the present disclosure include the broadcast service indication. A beacon is a type of an IEEE 802.11 management frame. In other examples, another type of an IEEE 802.11 management frame can be used to carry the broadcast service indication.

In other examples, the broadcast service indication can be included in a response message, such as a Probe response message, an Access Network Query Protocol (ANQP) response message, and so forth.

A Probe response according to IEEE 802.11 is a response to a Probe request sent by the endpoint device (e.g., 204 in FIG. 2). A Probe request can be transmitted by an endpoint device for receipt by one or more APs within the range of the wireless device. The Probe request is used by the endpoint device to discover AP(s) within the wireless communication range of the endpoint device.

ANQP is a type of an advertisement protocol. ANQP operates as a simple request and response protocol that is used by a device to discover a range of information from an "Access Network" (AN) server. This AN server is either co-located with an AP or is located within a LAN, which is the layer 2 network to which the AP is connected. ANQP allows a device to determine the properties of the LAN before starting an association procedure.

In other examples, the broadcast service indication sent can be included in another message.

In addition, as part of the discovery phase 302, the recipient wireless device (which in this case is the endpoint device 104) can send a request to the AP 106 requesting information of further details (e.g., characteristics and/or state) of a broadcast service(s), and in response, the AP 106 responds with a response containing the requested information. Examples of information included in the response can include any or some combination of the following: a number of stream(s) the source wireless device has available to send in group-addressed transmissions, channels (or sub-channels) on which the stream(s) is (are) broadcast, time and availability of the stream(s), whether security is provided on the stream(s), and so forth.

The subscription/control phase 304 can include control messages exchanged between the endpoint device 104 and the AP 106 to control the group-addressed transmission of data.

In the subscription/control phase 304, the group-addressed transmission control engine 112 in the endpoint device 104 can send (at 308) a Broadcast Inquiry Request message to the AP 106. The Broadcast Inquiry Request message can be sent as a unicast message, and includes information indicating that the endpoint device 104 is interested in group-addressed data transmitted by the AP 106 (or another device coupled to the AP 106). In addition, the Broadcast Inquiry Request message can include identifier(s) of stream(s) of the group-addressed data that the endpoint device 104 is interested in. The Broadcast Inquiry Request message is an example of how a wireless device can subscribe to a stream.

In the subscription/control phase 304, the group-addressed transmission control engine 114 in the AP 106 responds to the Broadcast Inquiry Request message by sending (at 310), as a unicast message, a Broadcast Inquiry Response message.

The Broadcast Inquiry Response message can include information usable by the endpoint device 104 in receiving a group-addressed transmission from the AP 106. For example, Broadcast Inquiry Response message can include an Orthogonal Frequency-Division Multiple Access (OFDMA) resource unit (RU), a channel, a secondary channel, or other transmission resource to use for the group-addressed transmission. The AP 106 may provide OFDMA resource allocation such that some RUs are used for group-addressed transmissions, and other RUs are used for unicast transmissions. A wireless device may receive group-addressed data frames and unicast data frames, from different source addresses in the WLAN 102, on different subchannels (or RUs) simultaneously. This type of multiple access is enabled by the OFDMA capabilities in IEEE 802.11ax, for example.

Further, the Broadcast Inquiry Response message can include a Multicast Group Temporal Key (MGTK) specific to a stream that the endpoint device 104 is interested in. If the endpoint device 104 has expressed interest in multiple streams using information in the Broadcast Inquiry Request message, the Broadcast Inquiry Response message can include multiple MGTKs for the respective streams.

The group-addressed transmission control engine 112 in the endpoint device 104 sends (at 312), as a unicast message, a Broadcast Inquiry Confirm message to acknowledge the Broadcast Inquiry Response message received from the AP 106.

The group-addressed transmission control engine 114 of the AP 106 may start (or stop) a stream based on control messaging exchanged during the subscription/control phase 304. In some cases, the sender wireless device (e.g., the AP 106 or another wireless device coupled to the AP 106) may have already been transmitting a given stream to other recipient wireless devices. In such cases, the AP 106 does not have to start the transmission of the given stream, but can just provide the recipient wireless device information about the ongoing given stream (e.g., keys, channel, timing information, etc.). However, if a recipient wireless device requests a stream in the Broadcast Inquiry Request that the AP 106 (or another wireless device) has not yet started transmitting, the AP 106 (or another wireless device) can start transmitting the stream.

In the subscription/control phase 304, a recipient wireless device can also request the stopping of a stream. In such cases, the group-addressed transmission control engine 114 of the AP 106 can make a determination of whether or not to stop the stream. For example, the AP 106 (or another wireless device) may be transmitting the stream to other recipient wireless devices; in such a scenario, the AP 106 (or another wireless device) can continue to perform the group-addressed transmission of the stream so regardless of the stop request, if one or more (e.g., a threshold number of) other wireless devices are subscribed to the stream.

The control messages exchanged in the subscription/control phase 304 can include Generic Advertisement Service (GAS) or ANQP request and response messages (according to IEEE 802.11aq) or other types of messages (in state 1 or 4). In some examples, the control messages can include Current Traffic Specification (TSPEC) information, which allows one wireless device to signal its traffic requirement to another wireless device.

In further examples, Internet Group Management Protocol (IGMP) snooping allows a network infrastructure (e.g., an AP or another network device) to determine that a wireless device (e.g., the endpoint device 104) is interested in group-addressed data. IGMP snooping can be used at the AP 106 to manage the list of streams (as group addresses in use) and the wireless devices subscribed to those streams.

Once the subscription/control phase 304 is performed, the AP 106 can broadcast data in the broadcast phase 306. In the broadcast phase 306, the AP 106 (or another wireless device coupled to the AP 106) sends (at 314) group-addressed transmissions to the endpoint device 104.

Each stream that is sent in a group-addressed transmission can include streaming data, such as audio, video, or sensor data. The stream can be transmitted periodically from the AP 106 to wireless device(s) that subscribe(s) to the stream, or can be transmitted intermittently in response to an event.

Each group-addressed transmission from the AP 106 includes one or more frames (data frame and/or management frame), which can be sent to a wireless device in State 4 or State 1. A value of one or more of the addresses in the three address MAC header of each frame may correspond to the multicast or broadcast destination address of the stream. The frames may be transmitted in a particular resource unit (RU) of an IEEE 802.11ax OFDMA transmission, for example. A stream may be transmitted in a channel adjacent to another channel used for unicast data. Alternatively, a dedicated subchannel (e.g., an OFDMA RU) can be used to carry the stream.

For a wireless device in State 1, the determination of whether a received frame is part of a stream starts by checking the 3 addresses, and whether the BSSID matches the multicast address of a particular stream.

Communication bandwidth depends on the type of stream. The AP 106 may allocate RU sizes based on requirements of the stream.

The transmission of frames of a stream may be synchronized with a power save state such as Traffic indication map/Delivery traffic indication map (TIM/DTIM) periods or target wake time (TWT) periods. This may be communicated from to the receiving device such that it can optimize the power saving of its receiver hardware.

TIM/DTIM periods are periods that define a general time for a wireless device to be in a power-save mode or be awake. Therefore if the transmission of group-addressed data from an AP is synchronised based on the TIM/DTIM transmissions from the same AP, then the recipient wireless device may be awake to receive the group-addressed data. TWT periods define when a wireless device is to wake up to receive data.

Security

Security in a BSS can use an encryption key for encrypting a data frame. The key can include a group key. In IEEE 802.11-2016, a Group Temporal Key (GTK) that is distributed by an AP has a key identifier (Key ID) of 0 or 1 and is applied to all group-addressed data.

In accordance with some implementations of the present disclosure, multiple group keys can be used for different streams of group-addressed data or different groups of wireless devices. Such a group key can be referred to as a Multicast GTK (MGTK). One or more MGTKs can be defined. In such implementations, the IEEE 802.11-2016 GTK can be referred to as a Broadcast GTK (BGTK).

To enable MGTK, a new Authentication and Key Management (AKM) (or set of AKMs) is defined that support BGTK and MGTK. Support for the new AKM or set of AKMs can be negotiated between the AP 106 and the wireless devices during the association process. When using this new AKM instead of previously defined AKM a larger number of Key IDs are enabled as described later.

The AP 106 maintains a mapping between the MGTK, a group-addressed stream, and a set of wireless devices subscribed to the group-addressed stream. Each group of wireless devices (referred to as an "MGTK group") that employ a particular MGTK is assigned a respective identifier (referred to as an "MGTK identifier"). Different groups of wireless devices that employ respective different MTGKs are assigned different identifiers.

The AP 106 may advertise one or more group-addressed streams in beacons, Probe responses, or other messages or information elements. This advertisement includes information about the MGTK to use for each stream.

After a wireless device has subscribed to a group-addressed stream, the AP 106 assigns the wireless device to an MGTK group and transmits the MGTK to the wireless device in a GTK handshake exchange.

The endpoint device 104 and/or the AP 106 can each advertise support for MGTK. For example, support for MGTK can be advertised as a service or an element in an ANQP message or another type of message.

When the endpoint device 104 associates with the AP 106, the endpoint device 104 and the AP 106 can negotiate support for MGTK, such as by using a 4-way handshake. For example, the negotiated MGTK can be indicated in a capability bit in a Robust Security Network Element (RSNE) in an association request, or can be included in a set of new AKM suites in the RSNE.

A control element to be modified is a Key Data Element (KDE), which can be modified as shown in FIG. 4. The KDE of FIG. 4 includes a Key ID 402, with both bits set to "1" to indicate use of MGTK. An MGTK Key ID 404 identifies an MGTK, and a GTK or MGTK field includes a GTK or an MGTK (MGTK if both bits of the Key ID 402 are set to "1"). Although example value and lengths are shown in FIG. 4, it is noted that in other examples, other values and/or lengths can be used.

The AP and wireless device(s) store the MGTK. This multiplicity of Key IDs allows a larger number of Key IDs than just 0 and 1. This then enables an AP to maintain the multiple groups/sets of devices with different MGTKs. The differentiating Key IDs also enables STAs to maintain keys of multiples of these groups simultaneously.

For an associated wireless device, the capability of supporting more than one group key (GTK) in the BSS is exchanged at the time of association. Each group-addressed stream can be protected with a respective different group key (GTK). A group key (GTK) can include a BGTK or an MGTK (from among multiple MGTKs).

When the AP transmits a group-addressed stream, the AP encapsulates a frame using the MGTK. The encapsulation works in one of the following ways.

In an example, the AP uses a bit in a Counter Mode with Chaining Message Authentication Code Protocol/Galois Counter Mode Protocol (CCMP/GCMP) header 500 (FIG. 5) to indicate that a stream is a group-addressed stream, and encapsulates each frame of the stream using the appropriate MGTK.

In another example, the AP indicates the MGTK Key ID in the CCMP/GCMP header of each frame transmitted to indicate the Key ID of the specific MGTK that the receiver should use to decode the data PDU carried in that frame. The CCMP/GCMP header 500 is included as part of a data frame (a CCMP MPDU). The CCMP/GCMP header 500 includes a reserved field 502, an MGTK Key ID field 504 that includes an MGTK Key ID, an Ext IV field 506, and a Key ID field 508 (which if set to a specified value, such as both bits "1" indicates that an MGTK Key ID is assigned in the header 500).

When an associated wireless device receives a group-addressed frame for a stream that the wireless device has not subscribed to, the wireless device drops the frame based on its multicast address, or drops the frame for which the wireless device does not have an MGTK.

An AP assigning a singular GTK to a STA is accomplished during a 4-way handshake once a pairwise transient key (PTK) is generated. In the case of assigning multiple GTK and MGTK this can be done in unicast messages from AP to STA secured by the PTK and MIC at any point after the 4-way handshake. The AP can set a new MGTK or update an existing MGTK by indicating the Key ID of the MGTK it is assigning a new value to. The AP can also send a frame to the STA indicating that a particular Key ID is no longer valid. In this case the STA should delete that MGTK, but since that cannot be guaranteed, the AP shall not reuse an old value of an MGTK at a later time.

General Arrangement

Figure 6:
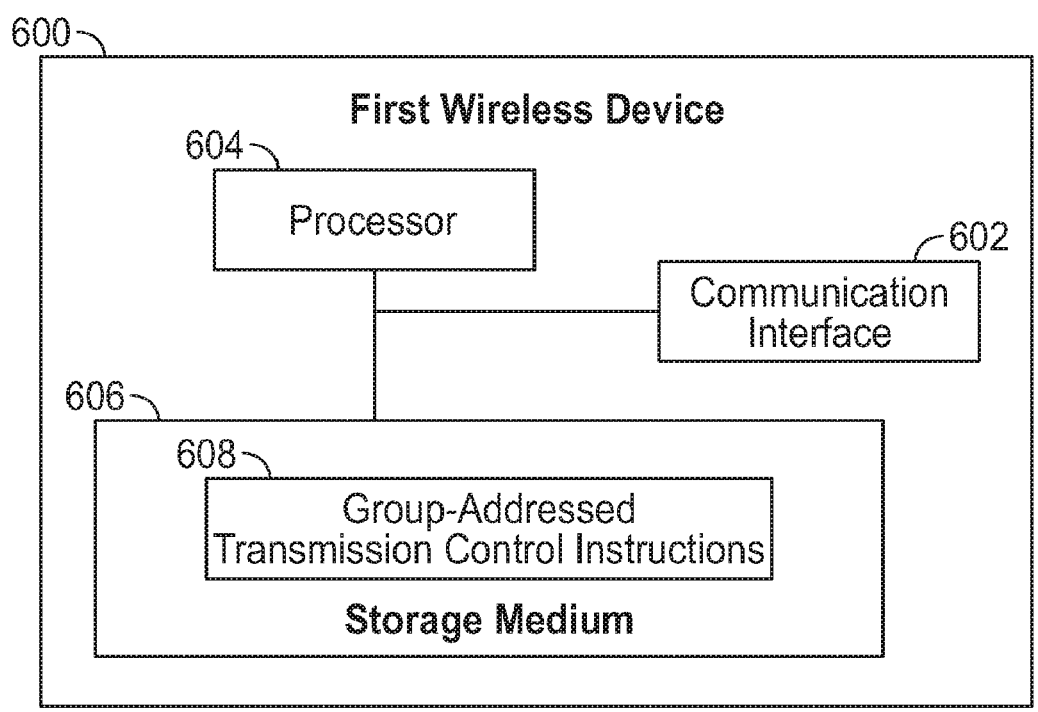
FIG. 6 is a block diagram of a wireless device according to some implementations of the present disclosure.

FIG. 6 is a block diagram of a first wireless device 600 that is able to transmit or receive group-addressed data according to some examples. The first wireless device 600 can be the endpoint device 104 of FIG. 1, for example.

The first wireless device 600 includes a communication interface 602 to communicate over a WLAN. The communication interface 602 includes a transceiver and a protocol stack including protocol layers that manage communication according to respective communication protocols.

The first wireless device 600 includes one or more hardware processors 604. A hardware processor can include a microprocessor, a core of a multi-core microprocessor, a microcontroller, a programmable integrated circuit, a programmable gate array, a digital signal processor, or another hardware processing circuit.

The first wireless device 600 further includes a non-transitory machine-readable or computer-readable storage medium 606 storing machine-readable instructions that are executable on the one or more processors to perform respective tasks.

The machine-readable instructions can include group-addressed transmission control instructions 608 to manage communications of group-addressed data.

The group-addressed transmission control instructions 608 are executable to send, from the first wireless device 600 to a second wireless device (e.g., the AP 106), a control indication that controls transmission of group-addressed data between the first wireless device and the second wireless device over the WLAN. For example, the control indication can include a start indication (e.g., the Broadcast Request message of FIG. 2) to start a procedure for the first wireless device 600 to send group-addressed data (e.g., 206 in FIG. 2).

As another example, the control indication can include another start indication (e.g., the Broadcast Inquiry Request message of FIG. 3) to cause the second wireless device to transmit the group-addressed data to the first wireless device 600.

In response to the control indication, the first wireless device 600 receives a response indication (e.g., the Broadcast Response message of FIG. 2 or the Broadcast Inquiry Response message of FIG. 3) from the second wireless device regarding the transmission of the group-addressed data.

In examples where the first wireless device 600 is the sender of group-addressed data, the control indication identifies a plurality of streams of group-addressed data, and the response indication from the second wireless device identifies a subset of the plurality of streams of group-addressed data that the second wireless device has selected to receive. Further, the response indication can include timing information (e.g., the time limit indication discussed in the section "Group-addressed transmission start procedure" above) relating to a timing relating to when the second wireless device has chosen to receive the group-addressed data.

In some examples, the first wireless device 600 receives, from the second wireless device, a key for encrypting the group-addressed data, where the key is associated with a group of wireless devices, and where different groups of wireless devices are associated with different keys for data encryption. Further, the key is associated with a particular stream that includes the group-addressed data, and different streams of group-addressed data are associated with different keys for data encryption.

The storage medium 606 can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disc (CD) or a digital video disc (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

The invention claimed is:

1. A method comprising:
receiving, by an access point (AP) from a wireless device, a broadcast request message including information about a plurality of streams of data the wireless device is advertising to send in one or more group-addressed transmissions and a control indication that controls transmission of group-addressed data over a wireless local area network (WLAN);
broadcasting, by the AP in response to the broadcast request message, a broadcast response message, the broadcast response message including one or more stream indicators that indicate which of the plurality of streams of data the AP has chosen to receive;
sending, by the AP to the wireless device in response to the control indication, a response indication comprising timing information relating to a timing for the transmission of group-addressed data; and
in response to broadcasting the broadcast response message, receiving, by the AP in an uplink, one or more group-addressed transmissions of the chosen streams of data.

2. The method of claim 1, further comprising sending, by the AP to the wireless device, a stop request message to stop the transmission of one or more of the group-addressed transmissions of the chosen streams of data.

3. The method of claim 1, further comprising:
sending, by the AP, group-addressed data in a downlink.

4. The method of claim 3, wherein group-addressed data is synchronized to a power save state of the wireless device.

5. The method of claim 1, further comprising:
sending, by the AP to the wireless device, a key for encrypting or decrypting group-addressed data, wherein the key is associated with a group of wireless devices, and wherein different groups of wireless devices are associated with different keys for data encryption or data decryption.

6. The method of claim 5, wherein the key is further associated with a first stream in the group-addressed data, and wherein different streams in the group-addressed data are associated with different keys for data encryption or data decryption.

7. The method of claim 5, wherein the key is included in an advertisement broadcast by the AP.

8. The method of claim 7, wherein the advertisement broadcast identifies one or more streams in group-addressed data.

9. The method of claim 1, wherein the broadcast response message comprises a group-addressed destination address and a group-addressed Basic Service Set Identifier (BSSID).

10. The method of claim 1, wherein the group-addressed transmissions of the chosen streams of data comprise a transmission of more than one frame.

11. The method of claim 1, wherein the broadcast request message comprises a group-addressed destination address.

12. The method of claim 1, wherein the broadcast request message comprises a group-addressed Basic Service Set Identifier (BSSID).

13. The method of claim 1, wherein the broadcast request message is sent by the wireless device to the AP either in-band or out-of-band.

14. The method of claim 1, wherein each of the group-addressed transmissions comprise a header including a source Medium Control Access (MAC) address of the wireless device, a destination group address, and a group-addressed Basic Service Set Identifier (BSSID).

15. An access point (AP) comprising:
a storage medium; and
one or more processors configured to execute group-addressed transmission control instructions to manage communications of group-addressed data, the one or more processors configured to:
receive a broadcast request message and a control indication that controls transmission of group-addressed data over a wireless local area network (WLAN);
broadcast, in response to the broadcast request message, a broadcast response message;
send to a wireless device in response to the control indication, a response indication comprising timing information relating to a timing for the transmission of group-addressed data; and
in response to broadcasting the broadcast response message, receive, in an uplink, one or more group-addressed transmissions of chosen streams of data.

16. The AP of claim 15, wherein the broadcast request message is received from a wireless device and includes information about a plurality of streams of data the wireless device is advertising to send in one or more group-addressed transmissions.

17. The AP of claim 16, wherein the broadcast response message includes one or more stream indicators that indicate which of the plurality of streams of data the AP has chosen to receive.

18. A non-transitory machine-readable storage medium comprising instructions that upon execution cause an access point (AP) to:
receive a broadcast request message and a control indication that controls transmission of group-addressed data over a wireless local area network (WLAN);
broadcast, in response to the broadcast request message, a broadcast response message; send to a wireless device in response to the control indication, a response indication comprising timing information relating to a timing for the transmission of group-addressed data; and
in response to broadcasting the broadcast response message, receive, in an uplink, one or more group-addressed transmissions of chosen streams of data.

19. The non-transitory machine-readable storage medium of claim 18, wherein:
the broadcast request message is received from the wireless device and includes information about a plurality of streams of data the wireless device is advertising to send in one or more group-addressed transmissions; and
the broadcast response message includes one or more stream indicators that indicate which of the plurality of streams of data the AP has chosen to receive.

* * * * *